(12) United States Patent
Kutlu

(10) Patent No.: US 8,910,128 B2
(45) Date of Patent: Dec. 9, 2014

(54) METHODS AND APPARATUS FOR APPLICATION PERFORMANCE AND CAPACITY ANALYSIS

(75) Inventor: Gokhan Kutlu, Seattle, WA (US)

(73) Assignee: salesforce.com, inc., San Francisco, CA (US)

(*) Notice: Subject to any disclaimer, the term of this patent is extended or adjusted under 35 U.S.C. 154(b) by 140 days.

(21) Appl. No.: 13/525,694

(22) Filed: Jun. 18, 2012

(65) Prior Publication Data

US 2013/0024843 A1    Jan. 24, 2013

Related U.S. Application Data

(60) Provisional application No. 61/509,457, filed on Jul. 19, 2011.

(51) Int. Cl.
*G06F 9/44* (2006.01)
*G06F 11/34* (2006.01)
*G06F 11/32* (2006.01)

(52) U.S. Cl.
CPC ........ *G06F 11/3414* (2013.01); *G06F 2201/80* (2013.01); *G06F 11/3466* (2013.01); *G06F 2201/865* (2013.01); *G06F 11/323* (2013.01); *G06F 11/3442* (2013.01); *G06F 11/3409* (2013.01)
USPC ........... 717/131; 717/113; 717/126; 717/127; 717/130

(58) Field of Classification Search
CPC combination set(s) only.
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,003,075 A * | 12/1999 | Arendt et al. | 709/221 |
| 6,067,412 A * | 5/2000 | Blake et al. | 718/102 |
| 6,088,732 A * | 7/2000 | Smith et al. | 709/229 |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,243,774 B1 * | 6/2001 | Eide et al. | 710/302 |
| 6,266,669 B1 | 7/2001 | Brodersen et al. | |
| 6,295,530 B1 | 9/2001 | Ritchie et al. | |

(Continued)

*Primary Examiner* — Chameli Das
(74) *Attorney, Agent, or Firm* — Ingrassia Fisher & Lorenz, P.C.

(57) ABSTRACT

A computer-implemented method is provided for determining the performance of an application platform. The application platform includes one or more applications associated with a plurality of resources of a computer system. A plurality of synthetic resource consumers are disposed within the application platform. Each synthetic resource consumer is configured to consume at least one of the plurality of resources. A workload profile is provided to the plurality of synthetic resource consumers. The workload profile includes parameters specifying resource consumption by the plurality of synthetic resource consumers. Performance data is acquired based on the impact of the workload profile on the plurality of resources and the plurality of applications.

15 Claims, 5 Drawing Sheets

(56) References Cited

U.S. PATENT DOCUMENTS

| | | | |
|---|---|---|---|
| 6,324,568 B1 | 11/2001 | Diec et al. | |
| 6,324,693 B1 | 11/2001 | Brodersen et al. | |
| 6,336,137 B1 | 1/2002 | Lee et al. | |
| D454,139 S | 3/2002 | Feldcamp et al. | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans et al. | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 7,340,411 B2 | 3/2008 | Cook | |
| 7,406,678 B2* | 7/2008 | Gong et al. | 717/121 |
| 7,450,592 B2* | 11/2008 | Liu et al. | 370/395.52 |
| 7,620,655 B2 | 11/2009 | Larsson et al. | |
| 7,698,160 B2 | 4/2010 | Beaven et al. | |
| 7,954,090 B1* | 5/2011 | Qureshi et al. | 717/127 |
| 8,082,301 B2 | 12/2011 | Ahlgren et al. | |
| 8,095,413 B1 | 1/2012 | Beaven | |
| 8,095,594 B2 | 1/2012 | Beaven et al. | |
| 8,275,836 B2 | 9/2012 | Beaven et al. | |
| 8,533,674 B2* | 9/2013 | Abrams et al. | 717/120 |
| 2001/0044791 A1 | 11/2001 | Richter et al. | |
| 2002/0032754 A1* | 3/2002 | Logston et al. | 709/219 |
| 2002/0072951 A1 | 6/2002 | Lee et al. | |
| 2002/0082892 A1 | 6/2002 | Raffel | |
| 2002/0129352 A1 | 9/2002 | Brodersen et al. | |
| 2002/0140731 A1 | 10/2002 | Subramanian et al. | |
| 2002/0143862 A1* | 10/2002 | Peterson | 709/203 |
| 2002/0143997 A1 | 10/2002 | Huang et al. | |
| 2002/0162090 A1 | 10/2002 | Parnell et al. | |
| 2002/0165742 A1 | 11/2002 | Robbins | |
| 2003/0004971 A1 | 1/2003 | Gong | |
| 2003/0018705 A1 | 1/2003 | Chen et al. | |
| 2003/0018830 A1 | 1/2003 | Chen et al. | |
| 2003/0066031 A1 | 4/2003 | Laane et al. | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec et al. | |
| 2003/0189600 A1 | 10/2003 | Gune et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2004/0001092 A1 | 1/2004 | Rothwein et al. | |
| 2004/0010489 A1 | 1/2004 | Rio et al. | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan et al. | |
| 2004/0199489 A1 | 10/2004 | Barnes-Leon et al. | |
| 2004/0199536 A1 | 10/2004 | Barnes-Leon et al. | |
| 2004/0199543 A1 | 10/2004 | Braud et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0091098 A1 | 4/2005 | Brodersen et al. | |
| 2005/0108687 A1* | 5/2005 | Mountain et al. | 717/127 |
| 2007/0250629 A1* | 10/2007 | Blanding et al. | 709/226 |
| 2009/0132611 A1* | 5/2009 | Brown et al. | 707/203 |
| 2009/0138136 A1 | 5/2009 | Natsume | 701/1 |
| 2009/0199196 A1* | 8/2009 | Peracha | 718/104 |
| 2009/0210356 A1* | 8/2009 | Abrams et al. | 705/400 |
| 2009/0235268 A1* | 9/2009 | Seidman et al. | 718/104 |
| 2010/0040059 A1* | 2/2010 | Albert Hu | 370/392 |
| 2012/0089980 A1* | 4/2012 | Sharp et al. | 718/1 |
| 2012/0158817 A1* | 6/2012 | Lauderdale et al. | 709/201 |
| 2012/0254302 A1* | 10/2012 | Redstone et al. | 709/203 |

* cited by examiner

METHODS AND APPARATUS FOR APPLICATION PERFORMANCE AND CAPACITY ANALYSIS

CROSS-REFERENCE TO RELATED APPLICATION(S)

This application claims the benefit of U.S. Provisional Patent application Ser. No. 61/509,457 filed Jul. 19, 2011, the entire contents of which are incorporated by reference herein.

TECHNICAL FIELD

Embodiments of the subject matter described herein relate generally to software application analysis. More particularly, embodiments of the subject matter described herein relate to methods of for performing capacity analysis and otherwise measuring the performance of a software application.

BACKGROUND

Software applications can be viewed as a consumer of resources. Accordingly, it is often desirable for engineers to perform a "capacity analysis" of an application—i.e., measure and/or predict the amount or rate of consumption by that application of various resources, such as time, CPU, I/O, memory, network bandwidth, database connections, threads, database server memory, database buffers, and the like. In this way, the engineer can measure the current behavior, characteristics, and overall health of the system. Capacity analysis also helps the engineer determine whether the hardware and operating system on which the application is running will have sufficient resources in the future when resource consumption rates may change.

Currently known methods of performing capacity analysis are unsatisfactory in a number of respects. For example, it is common to exercise an application by applying a "workload" to its functional interfaces and then measuring its performance using various metrics. Such methods are time-consuming and difficult to perform since applications often do not consume resources in a predictable manner. Furthermore, such methods require an engineer to create a custom workload for many different components of the application, which may change over time, requiring the engineer to revise the workload.

Accordingly, there is a need for improved systems and methods for performing capacity analysis and otherwise analyzing the performance of software applications.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Embodiments of the subject matter described herein generally relate to systems and methods for performing capacity analysis of an application by modeling the application as a set of components that consume resources. In this way, the application model can be subjected to various workloads in a test environment to predict the resource consumption for the application in a production environment.

Figure 1:
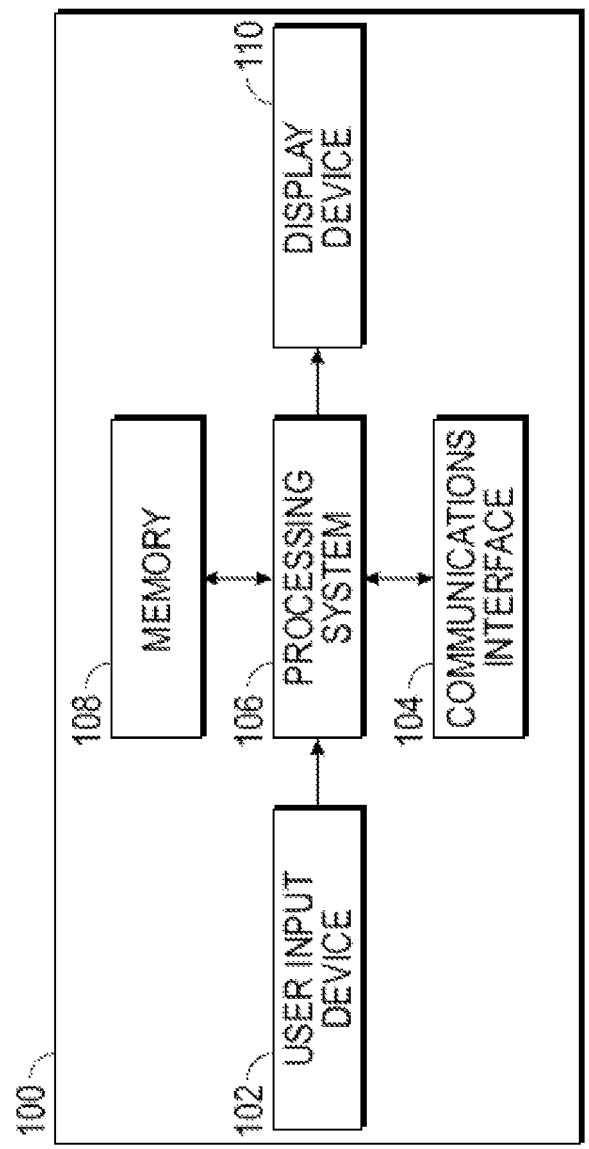
FIG. 1 is a conceptual block diagram showing an exemplary computing device.

FIG. 1 depicts an exemplary embodiment of a computing device 100 suitable for performing or otherwise supporting the processes, tasks, functions, and/or operations described herein. The computing device 100 includes, without limitation, a user input device 102, a communications interface 104, a processing system 106, a memory 108, and a display device (or display module) 110. Depending on the embodiment, the computing device 100 may be realized as a server, a desktop computer, a smart-phone, a tablet computer, or any another such device. It should be understood that FIG. 1 is a simplified representation of computing device 100 and is not intended to limit the subject manner described herein in any way.

In the illustrated embodiment, user input device 102 generally represents the hardware and/or other components coupled to processing system 106 for providing a user interface to computing device 100. For example, the user input device 102 may be realized as a key pad, a keyboard, a touch panel, a touchscreen, or any other device capable of receiving input from a user. The communications interface 104 generally represents the hardware, software, firmware and/or combination thereof that are coupled to the processing system 106 and configured to transmit and/or receive data packets to and/or from the computing device 100 via a communications network, such as the Internet or another computer network. In this regard, the communications interface 104 may include one or more amplifiers, filters, modulators and/or demodulators, digital-to-analog converters (DACs), analog-to-digital converters (ADCs), antennas, or the like. In an exemplary embodiment, the display device 110 is realized as an electronic display device configured to graphically display information and/or content under control of the processing system 106.

In the computing device 100 of FIG. 1, the processing system 106 generally represents the hardware, software, firmware, processing logic, and/or other components of the processing system 106 configured to support operation of the computing device 100 and/or execute various functions and/or or processing tasks described in greater detail below. Depending on the embodiment, the processing system 106 may be implemented or realized with a general purpose processor, a microprocessor, a controller, a microcontroller, a state machine, a content addressable memory, an application specific integrated circuit, a field programmable gate array, any suitable programmable logic device, discrete gate or transistor logic, discrete hardware components, or any combination thereof, configured to perform the functions described herein. Furthermore, the steps of a method or algorithm described in connection with the embodiments disclosed herein may be embodied directly in hardware, in firmware, in a software module executed by processing system 106, or in any practical combination thereof. The memory 108 is coupled to the processing system 106, and the memory 108 may be realized as any non-transitory short or long term storage media capable of storing computer-executable programming instructions or other data for execution by the processing system 106, including any sort of random access memory (RAM), read only memory (ROM), flash memory, registers, hard disks, removable disks, magnetic or optical mass storage, and/or the like. In an exemplary embodiment, the computer-executable programming instructions, when read and executed by the processing system 106, cause the processing system 106 to execute and perform one or more of the processes tasks, operations, and/or functions described herein.

Figure 2:
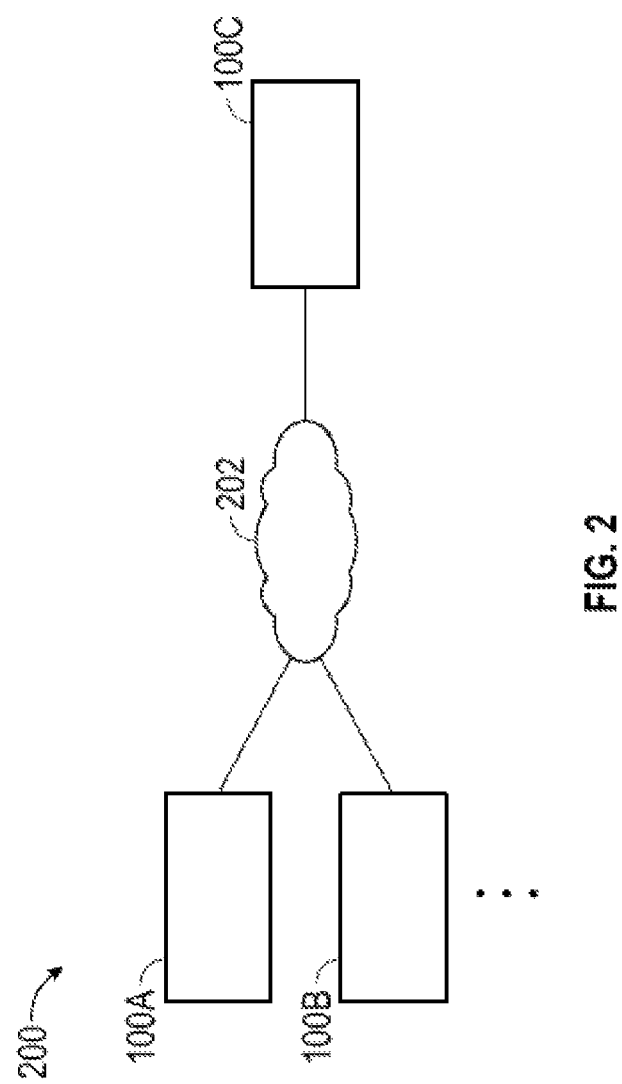
FIG. 2 is a conceptual block diagram depicting computing devices interconnected via a communication system.

As depicted in FIG. 2, multiple computing devices 100 may be interconnected in a communication system 200 via a communications network 204. Communications network 204 may be realized as any wired and/or wireless computer network that supports communications between computing devices 100 using one or more networking protocols and/or data communication methods, including, for example, IEEE 802.11 WiFi, Bluetooth, hypertext transport protocol (HTTP), transmission control protocol and/or Internet protocol (TCP/IP), and the like. In this regard, it should be understood that FIG. 2 is a simplified representation of a communications system presented for purposes of explanation and is not intended to limit the subject manner in any way.

Figure 3:
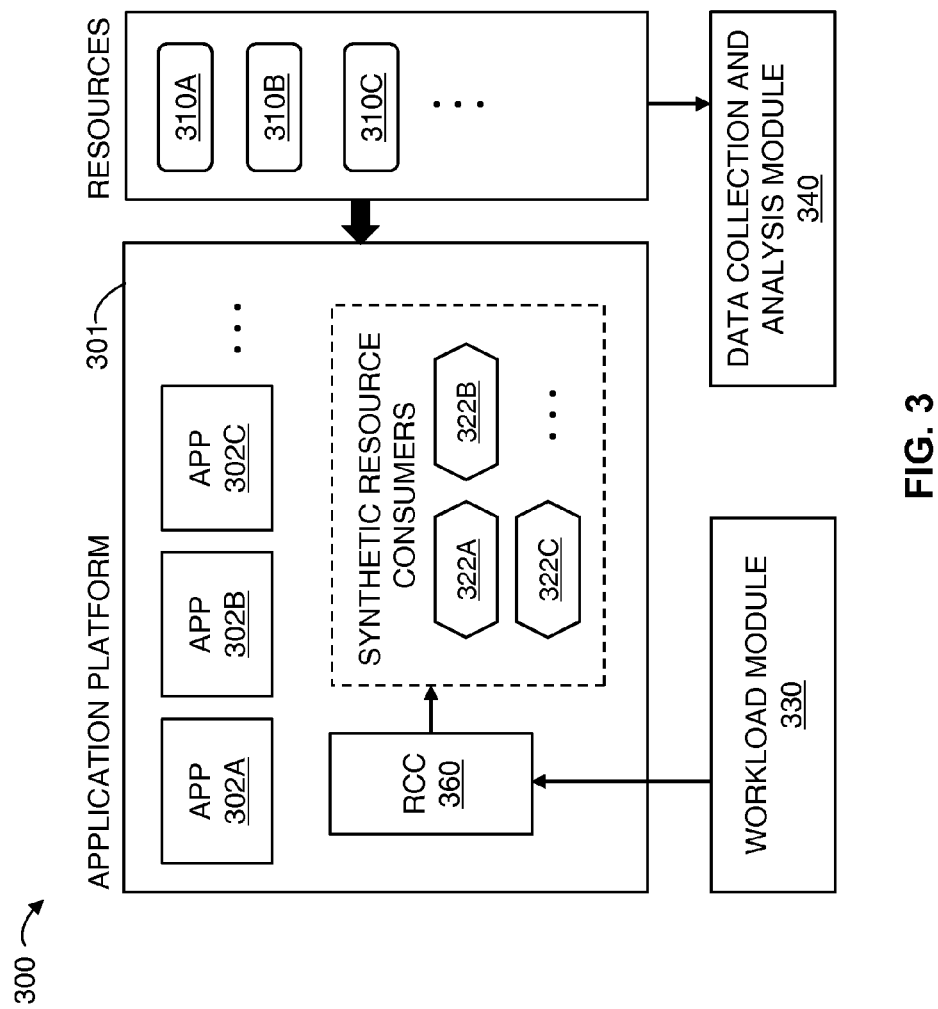
FIG. 3 is a conceptual block diagram depicting an application model in accordance with various embodiments.

Referring now to FIG. 3, an application performance and capacity analysis system 300 generally includes an application platform 301 having a number of applications 302 (e.g., 302A, 302B, etc.) provided therein. Application platform 301, as well as applications 302, consume a number of resources 310 (e.g., 310A, 310B, etc.) during operation. In addition, and as described in further detail below, one or more synthetic resource consumers ("SRCs") 322 (e.g., 322A, 322B, etc.) are provided within application platform 301. A workload module 330 is communicatively coupled to a resource consumer controller (RCC) 360, which itself is coupled to the SRCs 322, and a data collection and analysis module (DCAM) 340 is communicatively coupled to resources 310. In general, as used herein, the term "application performance analysis" refers to the general category of measuring one or more metrics of an application's behavior, while "capacity analysis" refers more narrowly to determining the extent to which an application consumes resources and/or the extent to which existing resources can support a particular application.

With continued reference to FIG. 3, resources 310 may include any number of resources traditionally required to operate modern software systems. Example types of resources 310 include, without limitation, time, CPU (i.e. percentage of core use), input output requirements (I/O), memory (e.g., RAM), network bandwidth, database connections, software threads, database server memory, database buffers, and the like.

The rate at which or the amount by which an application 302 (and an SRC 322) consumes a particular type of resource 310 is referred to herein as the "resource consumption profile" (RCP) for that resource. For example, an application may consume 200 MB of memory per second. Accordingly, that application's resource consumption profile with respect to the memory resource (or simply "memory profile") would be quantified as 200 MB/s. The set of resource consumption profiles for an application 302 is referred to herein as its "aggregate resource consumption profile" (ARCP). The aggregate resource consumption profile characterizes the application's consumption of multiple resource types.

Application platform 301 includes any set of software packages, frameworks, applications, libraries, and the like configured to allow other applications to be developed and deployed within application platform 301. For example, application platform 301 might be a multi-tenant user database (as described below in conjunction with FIG. 5), a web application, a cloud application server, a cloud computing platform, such as force.com, a blogging environment, and any other such platform now known or developed in the future.

Applications 302 each include any combination of software components configured to provide certain computer-implemented functionality, as is known in the art. Nonlimiting examples of applications 302 include database applications, word processing applications, games, social networking applications, blogs, websites, and the like. In some embodiments, applications 302 are developed and deployed entirely within application platform 301, as would be the case with software-as-a-service (SaaS) systems, multi-tenant database systems, cloud application systems, and the like.

SRCs 322 each include suitable software components configured to consume, in a controlled and predictable way, a particular resource 310. Thus, SRCs 322 are "synthetic" resource consumers in that, unlike applications designed to perform multiple functions, SRCs 322 operates solely to consume a particular resource. For example, SRC 322A may be configured to consume a specific amount of a CPU resource, SRC 233B may be configured to consume a particular amount of a memory resource, and SRC 322C may be configured to consume particular database CPU resource. While resources 310 are illustrated as being consumed by a single application platform 301, multiple application platforms may share a common set of resources 310.

Thus, each SRC 322 functions to take at least one parameter as an input (10%, 20%, etc.) and then consume resources corresponding to that SRC 322. Accordingly, each SRC 322 may be a relatively simple piece of computer code. The design of software components adapted to consume a particular amount of a resource is known in the art, and need not be described further herein. For example, an SRC 322 configured to consume memory space need only allocate and hold on to (i.e., not release) a given number of bytes of memory. Similarly, an SRC 322 configured to consume a CPU resource need only run a known, CPU-bound and CPU-intensive algorithm at a particular rate.

RCC 360 includes any combination of software components configured to instruct SRCs 322 to consume appropriate resources. Communication between RCC 360 and SRCs 322 may take place via message passing or any other conventional communication method.

Workload module 330 includes any combination of software components configured to communicate a workload profile to SRCs 322 via RCC 360, wherein the workload profile includes parameters specifying a desired resource consumption. For example, a workload profile might include parameters specifying that the SRCs 322 together consume 40% application server CPU, 200 MB of application server memory, and 30% of database server CPU for the duration of 500 milliseconds. In JSON format, for example, such a workload profile might appear as:

```
{
    "CPU": "40",
    "DB_CPU": "30",
    "MEMORY": "209715200",
    "TIME": "500"
}
```

Any number of messaging techniques may be used by workload module 330. In one embodiment, for example, the workload profile is provided to SRCs 322 via a message queue of an asynchronous task framework. Other interfaces may be used, however, including for example an application programming interface (API) running over an HTTP port or other port, a file, or a standard database.

DCAM 340 includes any combination of software components configured to acquire performance data based on the impact of the workload profile (sent by workload module 330) on resources 310A. That is, for example, DCAM 340 is preferably able to measure the extent to which SRCs 322 affect resources 310 and consequently the availability of those resources 310 to applications 302A.

Having thus given an overview of a system in accordance with various embodiments, an exemplary method will now be described in conjunction with FIGS. 3 and 4. The method will be described in the context of a particular use case—i.e., estimating the extent to which a new application 302 (e.g., an application that has not yet been deployed within application platform 301, also referred to as a "target application") will affect resources 310 and consequently the operations of applications 302 that have already been deployed.

Figure 4:
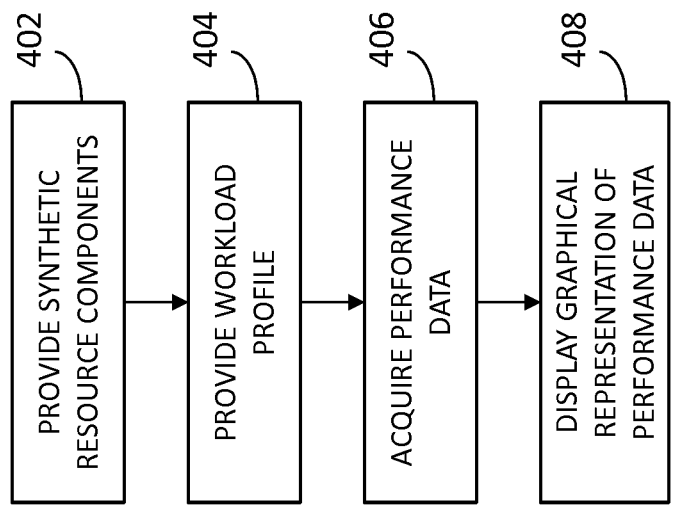
FIG. 4 is a flow chart depicting an exemplary capacity analysis procedure.

Referring now to FIG. 4, the method begins (at step 402) with providing a set of SRCs 322 and disposing them within application platform 301. That is, as SRCs 322 are intended to stress the resources consumed by the various applications (such as applications 302) running within application platform 301, it is necessary that SRCs 322 have access to the same set of resources 310 used by any other applications within application platform 301. As mentioned previously, the design of a particular SRC 322 for consuming a particular resource 310 is known, and need not be discussed in detail herein. In one embodiment, the plurality of resources include at least an application platform CPU resource, a memory resource, and a database CPU resource Next, in step 404, a workload profile is provided to the SRCs 322 (via RCC 360). In the current example, it is assumed that the workload profile corresponds to the projected workload of the target application. That is, it may have been determined a priori, either empirically or through a worst-case estimation, that the target application consumes 2% of a CPU resource and 100 MB of a memory resource. The workload profile would then be adapted to reflect this resource consumption profile.

As mentioned previously, in a particular embodiment the workload profile is provided to the SRCs via a message queue of an asynchronous task framework. In some embodiments, the workload profile is created automatically. In others, the workload profile is created manually by a user (e.g., as a simple text file).

Next, in step 406, performance data is acquired. That is DCAM 340 of FIG. 3, through conventional means known in the art, observes and records the extent to which resources 310 (and, optionally, applications 302) are impacted by the workload profile. The performance data may take a variety of forms, e.g., as a simple text list specifying the behavior of each of the resources 310 during the specified test time.

Finally, in step 408, the performance data is displayed as a graphical representation (e.g., by display device 110 of FIG. 1). The graphical representation may take a variety of forms, such as a spreadsheet and/or a chart depicting a change in each of the relevant resources 322 over time.

Thus, the performance data effectively allows the user (e.g., performance engineer) to estimate, with a reasonable amount of accuracy, the effect that deploying the target app (within application platform 301) will have on resources 310. As will be appreciated, the described method for performing capacity analysis is significantly less time-consuming and much easier to perform than prior art capacity analysis methods.

In accordance with one embodiment, a method includes providing to a third party an RCC 360, any interfaces required, and a set of SRCs 322 as part of an application framework that is, for example, sold or licensed. Further, the method may include providing (e.g., for a fee) a standard set of workloads using a standard set of resource consumption profiles for RCC 360. Stated another way, various software components may be provided to a third party, wherein the software components offer customized consumption of resources at dynamically adjustable rates in applications sold or licensed as a service in order to facilitate performance measurement. A standard set of workloads may be provided so that the workloads may be executed against the application platform 301 using a resource consumption workload interface.

In accordance with various embodiment, the systems and methods described above may be used in the context of a multi-tenant database system. More particularly, referring to FIG. 5, an exemplary multi-tenant system 500 includes a server 502 that dynamically creates and supports virtual applications 528 (which may correspond to applications 302 of FIG. 3) based upon data 532 from a common database 530 that is shared between multiple tenants, alternatively referred to herein as a multi-tenant database. Data and services generated by the virtual applications 528 are provided via a network 545 to any number of client computing devices 540, as desired. Each virtual application 528 is suitably generated at run-time using a common application platform 510 that securely provides access to the data 532 in the database 530 for each of the various tenants subscribing to the multi-tenant system 500. Common application platform 510 thus may correspond to application platform 301 of FIG. 3. In accordance with one non-limiting example, the multi-tenant system 500 is implemented in the form of a multi-tenant customer relationship management (CRM) system that can support any number of authenticated users of multiple tenants. Each of the components of FIG. 5 may consume a variety of resources, such as resources 310 of FIG. 3.

As used herein, a "tenant" or an "organization" should be understood as referring to a group of one or more users that shares access to common subset of the data within the multi-tenant database 530. In this regard, each tenant includes one or more users associated with, assigned to, or otherwise belonging to that respective tenant. Tenants may represent customers, customer departments, business or legal organizations, and/or any other entities that maintain data for particular sets of users within the multi-tenant system 500. Although multiple tenants may share access to the server 502 and the database 530, the particular data and services provided from the server 502 to each tenant can be securely isolated from those provided to other tenants. The multi-tenant architecture therefore allows different sets of users to share functionality without necessarily sharing any of the data 532 belonging to or otherwise associated with other tenants.

The multi-tenant database 530 is any sort of repository or other data storage system capable of storing and managing the data 532 associated with any number of tenants. The database 530 may be implemented using any type of conventional database server hardware. In some embodiments, the database 530 shares processing hardware 504 with the server 502, while in other embodiments, the database 530 is implemented using separate physical and/or virtual database server hardware that communicates with the server 502 to perform the various functions described herein.

In practice, the data 532 may be organized and formatted in any manner to support the application platform 510. In various embodiments, the data 532 is suitably organized into a relatively small number of large data tables to maintain a semi-amorphous "heap"-type format. The data 532 can then be organized as needed for a particular virtual application 528. In various embodiments, conventional data relationships are established using any number of pivot tables 534 that establish indexing, uniqueness, relationships between entities, and/or other aspects of conventional database organization as desired. Further data manipulation and report formatting is generally performed at run-time using a variety of metadata constructs. Metadata within a universal data directory (UDD) 536, for example, can be used to describe any number of forms, reports, workflows, user access privileges, business logic and other constructs that are common to multiple tenants. Tenant-specific formatting, functions and other constructs may be maintained as tenant-specific metadata 538 for each tenant, as desired. Rather than forcing the data 532 into an inflexible global structure that is common to all tenants and applications, the database 530 is organized to be relatively amorphous, with the pivot tables 534 and the metadata 538 providing additional structure on an as-needed basis. To that end, the application platform 510 suitably uses the pivot tables 534 and/or the metadata 538 to generate "virtual" components of the virtual applications 528 to logically obtain, process, and present the relatively amorphous data 532 from the database 530.

The server 502 is implemented using one or more actual and/or virtual computing systems that collectively provide the dynamic application platform 510 for generating the virtual applications 528. For example, the server 502 may be implemented using a cluster of actual and/or virtual servers operating in conjunction with each other, typically in association with conventional network communications, cluster management, load balancing and other features as appropriate. The server 502 operates with any sort of conventional processing hardware 504, such as a processor 505, memory 506, input/output features 507 and the like. The input/output features 507 generally represent the interface(s) to networks (e.g., to the network 545, or any other local area, wide area or other network), mass storage, display devices, data entry devices and/or the like. The processor 505 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 506 represents any non-transitory short or long term storage or other computer-readable media capable of storing programming instructions for execution on the processor 505, including any sort of random access memory (RAM), read only memory (ROM), flash memory, magnetic or optical mass storage, and/or the like. The computer-executable programming instructions, when read and executed by the server 502 and/or processor 505, cause the server 502 and/or processor 505 to establish, generate, or otherwise facilitate the application platform 510 and/or virtual applications 528 and perform additional tasks, operations, functions, and processes herein. It should be noted that the memory 506 represents one suitable implementation of such computer-readable media, and alternatively or additionally, the server 502 could receive and cooperate with computer-readable media (not separately shown) that is realized as a portable or mobile component or platform, e.g., a portable hard drive, a USB flash drive, an optical disc, or the like.

The application platform 510 is any sort of software application or other data processing engine that generates the virtual applications 528 that provide data and/or services to the client devices 540. In a typical embodiment, the application platform 510 gains access to processing resources, communications interfaces and other features of the processing hardware 504 using any sort of conventional or proprietary operating system 508. The virtual applications 528 are typically generated at run-time in response to input received from the client devices 540. For the illustrated embodiment, the application platform 510 includes a bulk data processing engine 512, a query generator 514, a search engine 516 that provides text indexing and other search functionality, and a runtime application generator 520. Each of these features may be implemented as a separate process or other module, and many equivalent embodiments could include different and/or additional features, components or other modules as desired.

The runtime application generator 520 dynamically builds and executes the virtual applications 528 in response to specific requests received from the client devices 540. The virtual applications 528 are typically constructed in accordance with the tenant-specific metadata 538, which describes the particular tables, reports, interfaces and/or other features of the particular application 528. In various embodiments, each virtual application 528 generates dynamic web content that can be served to a browser or other client program 542 associated with its client device 540, as appropriate.

The runtime application generator 520 suitably interacts with the query generator 514 to efficiently obtain multi-tenant data 532 from the database 530 as needed in response to input queries initiated or otherwise provided by users of the client devices 540. In a typical embodiment, the query generator 514 considers the identity of the user requesting a particular function (along with the user's associated tenant), and then builds and executes queries to the database 530 using system-wide metadata 536, tenant specific metadata 538, pivot tables 534, and/or any other available resources. The query generator 514 in this example therefore maintains security of the common database 530 by ensuring that queries are consistent with access privileges granted to the user that initiated the request.

Figure 5:
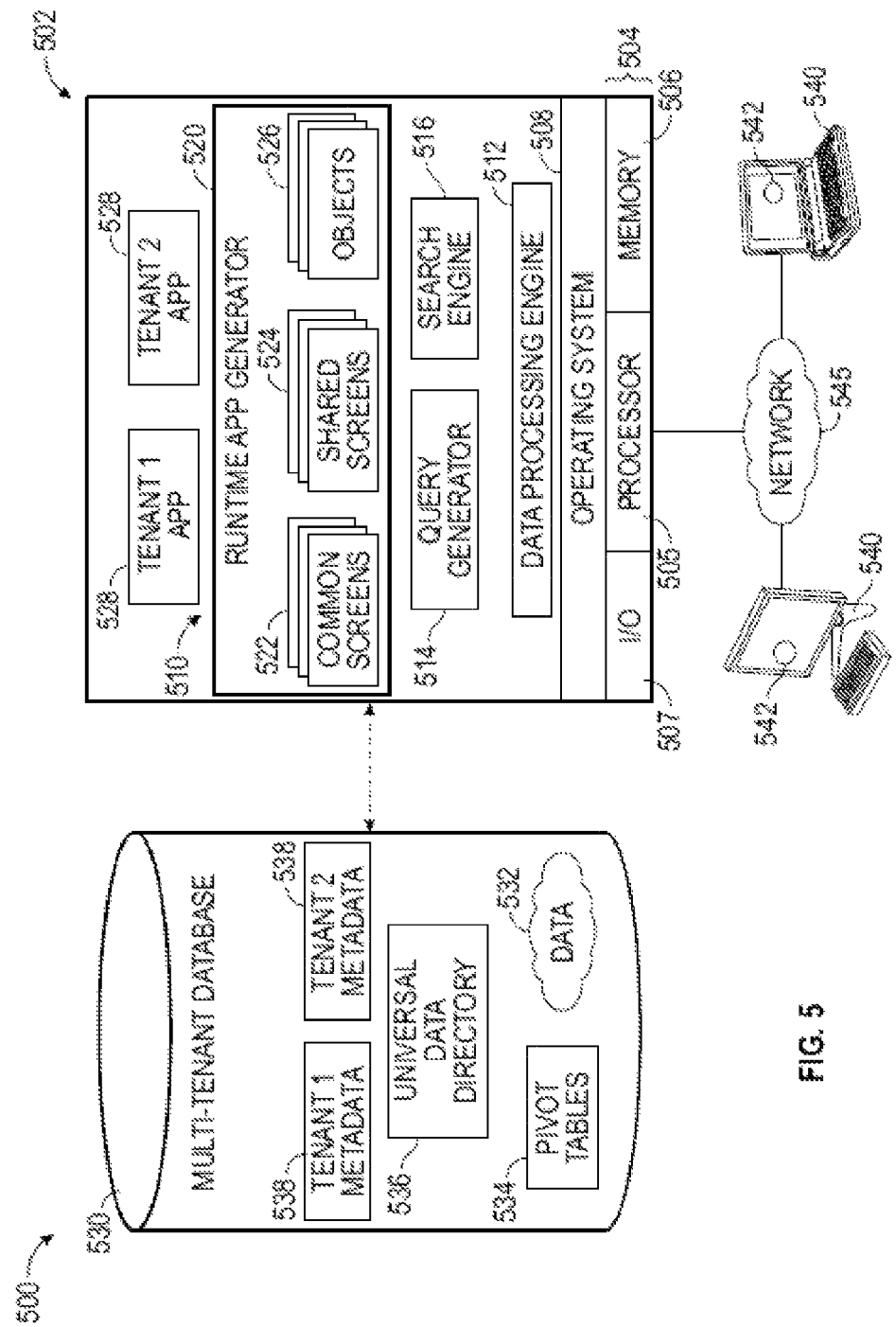
FIG. 5 depicts an exemplary multi-tenant database system.

Still referring to FIG. 5, the data processing engine 512 performs bulk processing operations on the data 532 such as uploads or downloads, updates, online transaction processing, and/or the like. In many embodiments, less urgent bulk processing of the data 532 can be scheduled to occur as processing resources become available, thereby giving priority to more urgent data processing by the query generator 514, the search engine 516, the virtual applications 528, etc.

In operation, developers use the application platform 510 to create data-driven virtual applications 528 for the tenants that they support. Such virtual applications 528 may make use of interface features such as tenant-specific screens 524, universal screens 522 or the like. Any number of tenant-specific and/or universal objects 526 may also be available for integration into tenant-developed virtual applications 528. The data 532 associated with each virtual application 528 is provided to the database 530, as appropriate, and stored until it is requested or is otherwise needed, along with the metadata 538 that describes the particular features (e.g., reports, tables, functions, etc.) of that particular tenant-specific virtual application 528. For example, a virtual application 528 may include a number of objects 526 accessible to a tenant, wherein for each object 526 accessible to the tenant, information pertaining to its object type along with values for various fields associated with that respective object type are maintained as metadata 538 in the database 530. In this regard, the object type defines the structure (e.g., the formatting, functions and other constructs) of each respective object 526 and the various fields associated therewith.

Still referring to FIG. 5, the data and services provided by the server 502 can be retrieved using any sort of personal computer, mobile telephone, tablet or other network-enabled client device 540 on the network 545. In an exemplary embodiment, the client device 540 includes a display device, such as a monitor, screen, or another conventional electronic display capable of graphically presenting data and/or information retrieved from the multi-tenant database 530, as described in greater detail below. Typically, the user operates a conventional browser or other client program 542 executed by the client device 540 to contact the server 502 via the network 545 using a networking protocol, such as the hypertext transport protocol (HTTP) or the like. The user typically authenticates his or her identity to the server 502 to obtain a session identifier ("SessionID") that identifies the user in subsequent communications with the server 502. When the identified user requests access to a virtual application 528, the runtime application generator 520 suitably creates the application at run time based upon the metadata 538, as appropriate. As noted above, the virtual application 528 may contain Java, ActiveX, or other content that can be presented using conventional client software running on the client device 540; other embodiments may simply provide dynamic web or other content that can be presented and viewed by the user, as desired. As described in greater detail below, the query generator 514 suitably obtains the requested subsets of data 532 from the database 530 as needed to populate the tables, reports or other features of the particular virtual application 528.

For the sake of brevity, conventional techniques related to computer programming, computer networking, data processing, cryptography, and other functional aspects of the systems (and the individual operating components of the systems) may not be described in detail herein. In addition, those skilled in the art will appreciate that embodiments may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first", "second" and other such numerical terms do not imply a sequence or order unless clearly indicated by the context.

Embodiments of the subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In this regard, it should be appreciated that the various block components and modules shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The foregoing description is merely illustrative in nature and is not intended to limit the embodiments of the subject matter or the application and uses of such embodiments. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary embodiments described herein are not intended to limit the scope or applicability of the subject matter in any way.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A computer-implemented method for determining the performance of an application platform comprising a plurality of applications associated with a plurality of resources of a computer system, the method comprising:

disposing a plurality of synthetic resource consumers within the application platform, each synthetic resource consumer configured to consume at least one of the plurality of resources;

providing a workload profile to the plurality of synthetic resource consumers, wherein the workload profile is empirically determined a priori and corresponds to a projected workload of a target application at the application platform, and wherein the workload profile includes parameters for each of the plurality of synthetic resource consumers that specify resource consumption by each of the plurality of synthetic resource consumers;

consuming the plurality of resources at the plurality of synthetic resource consumers in accordance with parameters of the workload profile for each of the plurality of synthetic resource consumers;

acquiring performance data based on the impact of the workload profile on the plurality of resources and the plurality of applications; and displaying a graphical representation of the performance data.

2. The method of claim 1, wherein each of the synthetic resource consumers are configured to consume an associated one of the plurality of resources, and the plurality of resources include at least an application platform Central Processing Unit resource, a memory resource, and a database Central Processing Unit resource.

3. The method of claim 1, further including determining the workload profile based on the resource consumption of a specific application that has not yet been deployed within the application platform.

4. The method of claim 1, wherein the application platform is a multi-tenant database.

5. The method of claim 1, wherein the workload profile is provided to the plurality of synthetic resource consumers via a message queue of an asynchronous task framework.

6. A computer-implemented performance analysis system for determining the performance of an application platform comprising a plurality of applications associated with a plurality of resources of a computer system, the computer-implemented performance analysis system comprising:

a plurality of synthetic resource consumers disposed within the application platform, each synthetic resource consumer configured to consume at least one of the plurality of resources and to consume the plurality of resources in accordance with a workload profile that is empirically determined a priori and corresponds to a projected workload of a target application at the application platform, wherein the workload profile includes parameters for each of the plurality of synthetic resource consumers that specify resource consumption by each of the plurality of synthetic resource consumers;

a resource consumer controller communicatively coupled to the plurality of synthetic resource consumers;

a workload module configured to provide the workload profile to the resource consumer controller, wherein each of the plurality of synthetic resource consumers consume the plurality of resources in accordance with parameters of the workload profile for each of the plurality of synthetic resource consumers;

a data collection and analysis module configured to acquire performance data based on the impact of the workload profile on the plurality of resources and the plurality of applications; and a display module configured to display a graphical representation of the performance data.

7. The computer-implemented performance analysis system of claim 6, wherein each of the synthetic resource consumers are configured to consume an associated one of the plurality of resources, and the plurality of resources include at least an application platform Central Processing Unit resource, a memory resource, and a database Central Processing Unit resource.

8. The computer-implemented performance analysis system of claim 6, wherein the workload profile is based on the resource consumption of a specific application that has not yet been deployed within the application platform.

9. The computer-implemented performance analysis system of claim 6, wherein the application platform is a multi-tenant database.

10. The computer-implemented performance analysis system of claim 6, wherein the workload is provided to the plurality of synthetic resource consumers via a message queue of an asynchronous task framework.

11. A computing device comprising a processing system and a memory, wherein the memory comprises computer-executable instructions that, when executed by the processing system, cause the computing device to:

dispose a plurality of synthetic resource consumers within the application platform, each synthetic resource consumer configured to consume at least one of the plurality of resources;

provide a workload profile to the plurality of synthetic resource consumers, wherein the workload profile is empirically determined a priori and corresponds to a projected workload of a target application at the application platform, and wherein the workload profile includes parameters for each of the plurality of synthetic resource consumers that specify resource consumption by each of the plurality of synthetic resource consumers;

consume the plurality of resources at the plurality of synthetic resource consumers in accordance with parameters of the workload profile for each of the plurality of synthetic resource consumers;

acquire performance data based on the impact of the workload profile on the plurality of resources and the plurality of applications; and display a graphical representation of the performance data.

12. The computing device of claim 11, wherein each of the synthetic resource consumers are configured to consume an associated one of the plurality of resources, and the plurality of resources include at least an application platform Central Processing Unit resource, a memory resource, and a database Central Processing Unit resource.

13. The computing device of claim 11, wherein the workload profile is based on the resource consumption of a specific application that has not yet been deployed within the application platform.

14. The computing device of claim 11, wherein the application platform is a multi-tenant database.

15. The computing device of claim 11, wherein the workload is provided to the plurality of synthetic resource consumers via a message queue of an asynchronous task framework.

* * * * *